(12) United States Patent
Lin et al.

(10) Patent No.: US 7,850,315 B2
(45) Date of Patent: Dec. 14, 2010

(54) PROJECTION APPARATUS AND LIGHT INTEGRATION ROD THEREOF

(75) Inventors: Jiunn-Lih Lin, Hsinchu (TW); Huang-Ming Chen, Hsinchu (TW); Pei-Ching Liu, Hsinchu (TW); Tzu-Kai Wang, Hsinchu (TW); Chih-Hsien Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 526 days.

(21) Appl. No.: 11/874,006

(22) Filed: Oct. 17, 2007

(65) Prior Publication Data
US 2008/0309890 A1     Dec. 18, 2008

(30) Foreign Application Priority Data
Jun. 13, 2007     (TW) ............................... 96209690 U

(51) Int. Cl.
*G03B 21/28* (2006.01)
(52) U.S. Cl. .............................. 353/99; 353/84; 362/26; 362/551
(58) Field of Classification Search ................... 353/99, 353/84; 362/26, 551
See application file for complete search history.

(56) References Cited

U.S. PATENT DOCUMENTS

| 5,625,738 | A | 4/1997 | Magarill | |
|---|---|---|---|---|
| 6,857,752 | B2 * | 2/2005 | Eckhardt | ...................... 353/97 |
| 6,915,063 | B2 * | 7/2005 | Kawaai et al. | .............. 385/146 |
| 7,020,379 | B2 * | 3/2006 | Lee | .............................. 385/39 |
| 7,287,863 | B2 * | 10/2007 | Liang et al. | .................... 353/84 |

FOREIGN PATENT DOCUMENTS

WO    WO2006009399    1/2006

* cited by examiner

*Primary Examiner*—Seung C Sohn
(74) *Attorney, Agent, or Firm*—J.C. Patents

(57) ABSTRACT

A light integration rod having a light input end and a light output end opposite to each other is provided. The light integration rod includes a first reflective plate, a second reflective plate, a third reflective plate and a fourth reflective plate. The second reflective plate is opposite to the first reflective plate. The third reflective plate and the fourth reflective plate connect the first reflective plate and the second reflective plate, and are disposed opposite to each other. A long side of the first reflective plate is not equal to a long side of the second reflective plate. A short side at the light output end of at least one of the first reflective plate and the second reflective plate is separate from a short side of the third reflective plate and a short side of the fourth reflective plate at the light output end.

18 Claims, 8 Drawing Sheets

PROJECTION APPARATUS AND LIGHT INTEGRATION ROD THEREOF

CROSS-REFERENCE TO RELATED APPLICATION

This application claims the priority benefit of Taiwan application serial no. 96209690, filed on Jun. 13, 2007. All disclosure of the Taiwan application is incorporated herein by reference.

BACKGROUND OF THE INVENTION

1. Field of the Invention

The present invention generally relates to a display apparatus and, more particularly, to a projection apparatus and a light integration rod thereof.

2. Description of Related Art

Referring to FIGS. 1A and 1B, a conventional projection apparatus 100 includes a light source module 110, a projection lens 120, a digital micro-mirror device (DMD) 130 and a symmetrical light integration rod 140. The light source module 110 is suitable for providing an illumination beam 112. The DMD 130 is suitable for reflecting the illumination beam 112 into an image beam 132 traveling to the projection lens 120, and the illumination beam 112 is obliquely incident upon the DMD 130. The symmetrical light integration rod 140 is disposed on the transmission path of the illumination beam 112 and is a hollow rod composed of four reflective plates 142a, 142b, 142c and 142c with equal lengths. The symmetrical light integration rod 140 has a light input end 144a and a light output end 144b. The illumination beam 112 from the light source module 110 enters the symmetrical light integration rod 140 through the light input end 144a, and is reflected many times. Then, the illumination beam 112 is output through the light output end 144b and travels to the DMD 130.

Since the symmetrical light integration rod 140 has a symmetrical structure, the focal plane 114 of the illumination beam 112 traveling to the DMD 130 is perpendicular to the optical axis of the illumination beam 112. However, since the illumination beam 112 is obliquely incident upon the DMD 130, the focal plane 114 has an obliquity angle θ with respect to the DMD 130 and does not fall on the DMD 130. As such, parts of the illumination beam 112 striking both ends 134a and 134b of the DMD 130 away from the focal plane 114 would be defocused.

The above-mentioned defocusing causes two edges of the light spot formed by the illumination beam 112 projected on the DMD 130 to blur, wherein the two edges are respectively close to the ends 134a and 134b of the DMD 130. Considering the blurring portion of the light spot has nonuniform brightness and irregular shape, the blurring portion is not suitable for being projected onto the display region of the DMD 130, which results in wasting a part of the illumination beam 112, lowering the utilization ratio of the illumination beam 112 and further making the brightness of display pictures provided by the projection apparatus 100 hard to be improved.

FIG. 2 is a 3D-diagram of a conventional wedge light integration rod. Referring to FIGS. 1A and 2, in order to lighten the blur extent at the edges of the above light spot, the symmetrical light integration rod 140 in the projection apparatus 100 may be replaced by a wedge light integration rod 140'. The wedge light integration rod 140' has an oblique light emitting section 142' at the light output end 144b' and the normal vector N of the light emitting section 142' has an obliquity angle φ with respect to the optical axis C of the wedge light integration rod 140'. The obliquity angle φ is corresponding to the included angle between the optical axis of the illumination beam. 112 and the DMD 130. By adjusting the obliquity angle φ, the focal plane of the illumination beam 112 may coincide with the DMD 130 as much as possible to lighten the blur extent of the edges of the light spot formed by illumination beam 112 projected on the DMD 130. However, during fabricating the wedge light integration rod 140', to make the light emitting section 142' oblique, parts of plates, which compose the wedge light integration rod 140', must be cut into trapezoid, which would increase the rest scrap after cutting. In addition, the cutting angle of the plates must be controlled quite precisely to make the focal plane of the illumination beam 112 coincide with the DMD 130 as much as possible. Therefore, the production cost of the wedge light integration rod 140' is higher.

SUMMARY OF THE INVENTION

Accordingly, the present invention is directed to a projection apparatus having a better utilization ratio of the illumination beam thereof and a lower production cost.

The present invention is also directed to a light integration rod capable of improving the utilization ratio of an illumination beam and lower the production cost thereof.

Other advantages of the present invention should be further indicated by the disclosures of the present invention.

To achieve one, a part or all of the above-mentioned or other advantages, an embodiment of the present invention provides a light integration rod adapted to be used in a projection apparatus. The light integration rod has a light input end and a light output end opposite to each other, and includes a first reflective plate, a second reflective plate, a third reflective plate and a fourth reflective plate. The first reflective plate has a short side located at the light output end and a long side. The second reflective plate is opposite to the first reflective plate, and has a short side located at the light output end and a long side. The third reflective plate connects the first reflective plate and the second reflective plate, and has a short side located at the light output end and a long side. The fourth reflective plate connects the first reflective plate and the second reflective plate, and is opposite to the third reflective plate. The fourth reflective plate has a short side located at the light output end and a long side. The length of the long side of the first reflective plate is unequal to the length of the long side of the second reflective plate. The short side of at least one of the first reflective plate and the second reflective plate is separate from the short side of the third reflective plate and the short side of the fourth reflective plate.

An embodiment of the present invention provides a projection apparatus including a light source module, a projection lens, a light valve and the above-mentioned light integration rod. The light source module is for providing an illumination beam. The light valve is for converting the illumination beam into an image beam and making the image beam travel to the projection lens, and the illumination beam is obliquely incident upon the light valve. The light integration rod is disposed on the transmission path of the illumination beam. The light input end of the light integration rod is located between the light source module and the light output end of the light integration rod, while the light output end is located between the light input end and the light valve.

In the projection apparatus, since the illumination beam is obliquely incident upon the light valve and the light integration rod adopts an asymmetric structure, the optical path length from the edge of the second reflective plate at the light output end to a corresponding end of the light valve more approximates the optical path length from the edge of the first reflective plate at the light output end to another corresponding end of the light valve, which is helpful to lighten the defocusing of the illumination beam at both ends of the light valve. In this way, the blurring extent of the edges of the light spot formed by the illumination beam projected onto the light valve is effectively reduced, such that a higher proportion of the illumination beam is utilized by the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
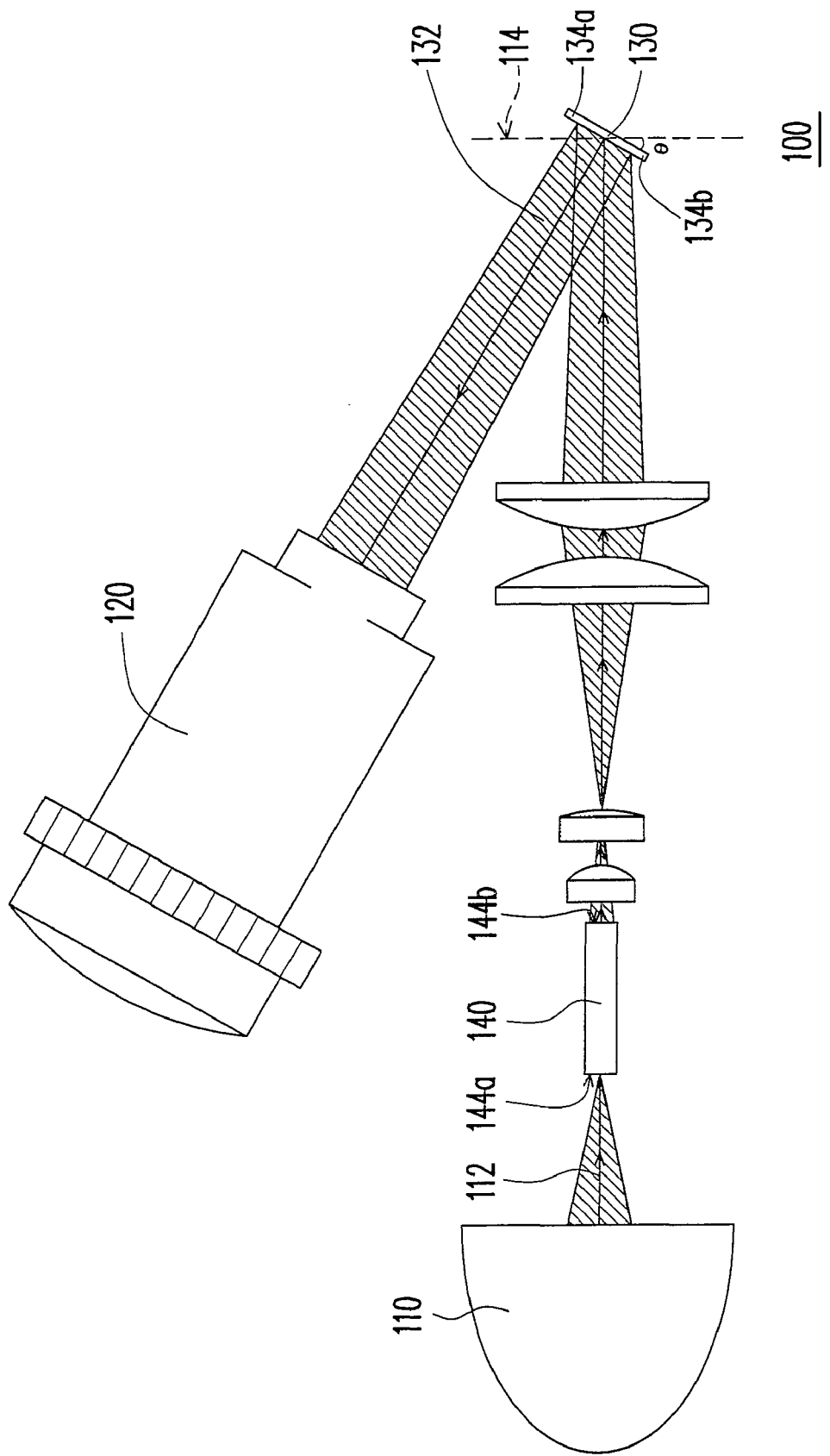
FIG. 1A is a structure diagram of a conventional projection apparatus.
Figure 1B:
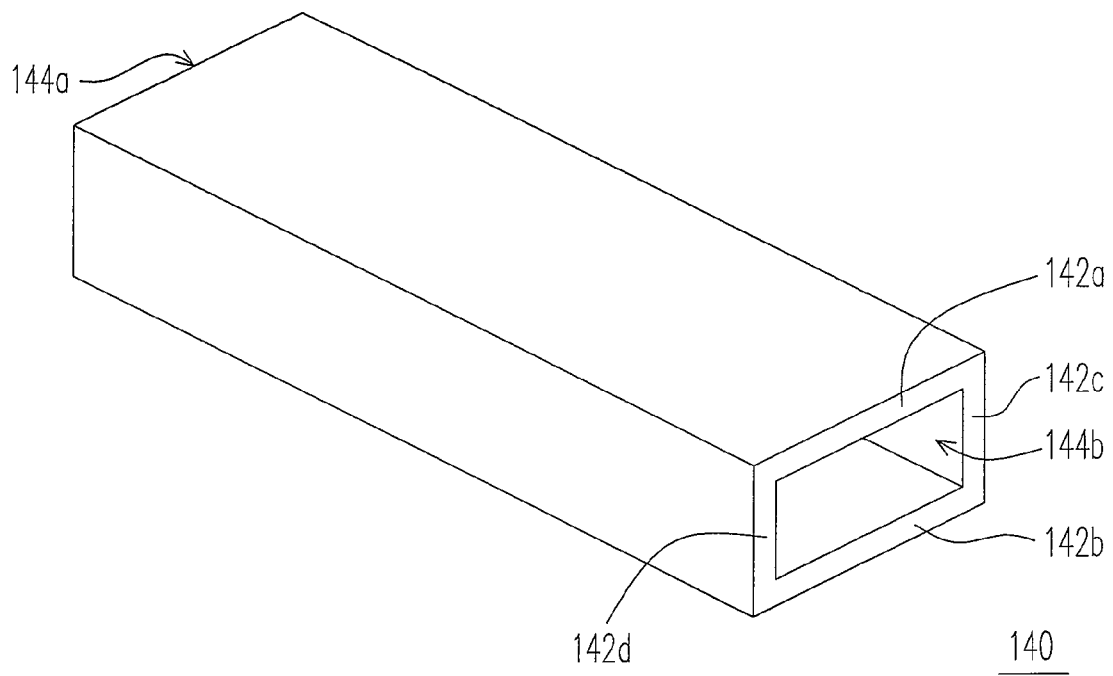
FIG. 1B is a 3D-diagram of the symmetrical light integration rod in FIG. 1A.
Figure 2:
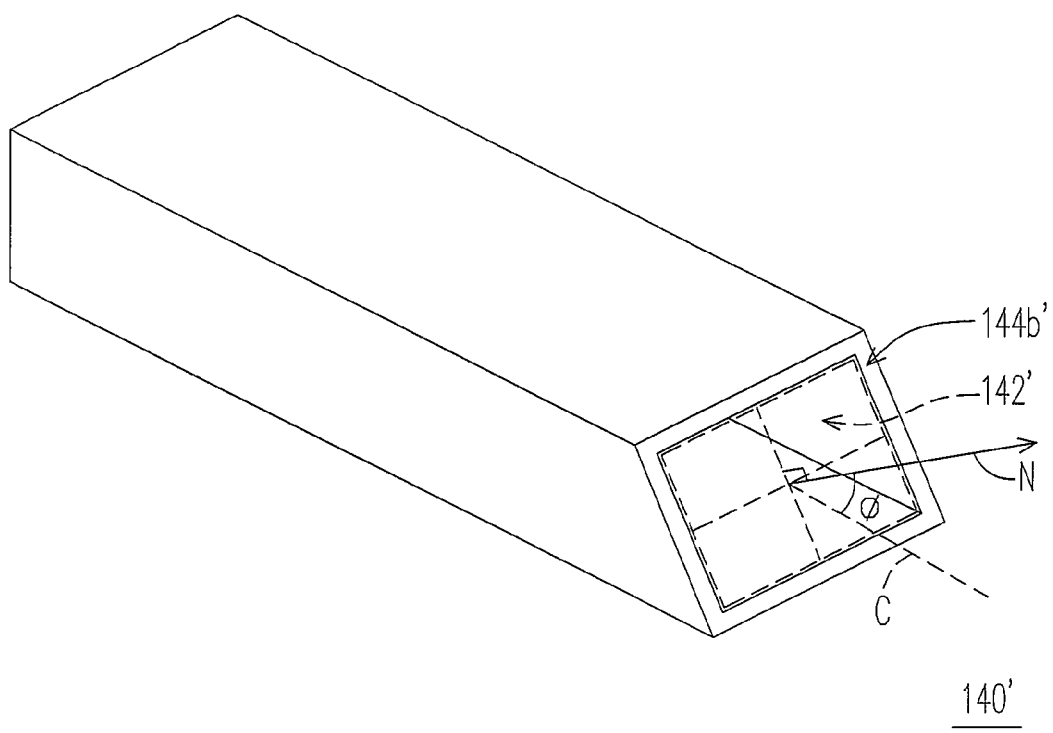
FIG. 2 is a 3D-diagram of a conventional wedge light integration rod.

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 3A:
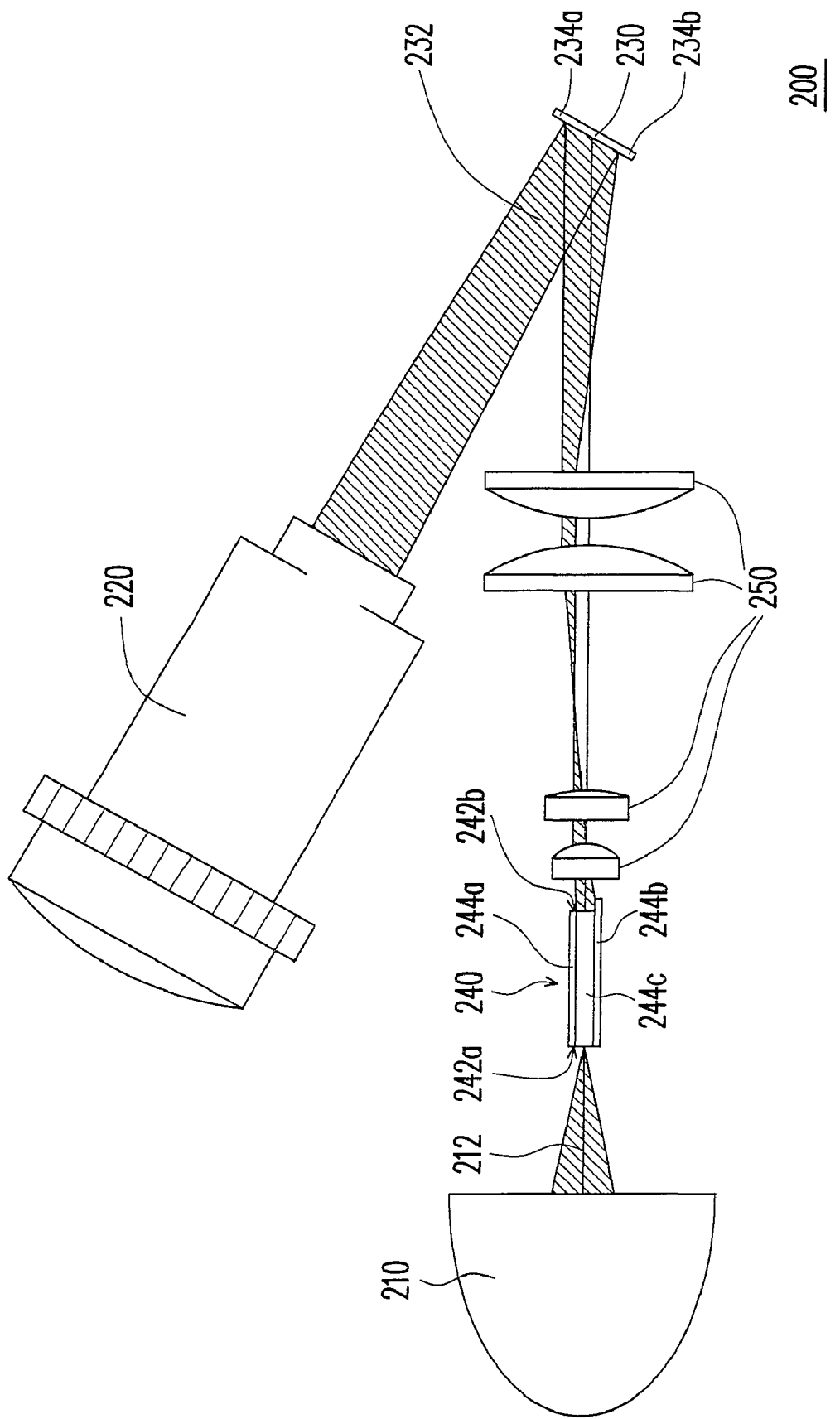
FIG. 3A is a structure diagram of a projection apparatus and the light integration rod thereof according to an embodiment of the present invention.
Figure 3B:
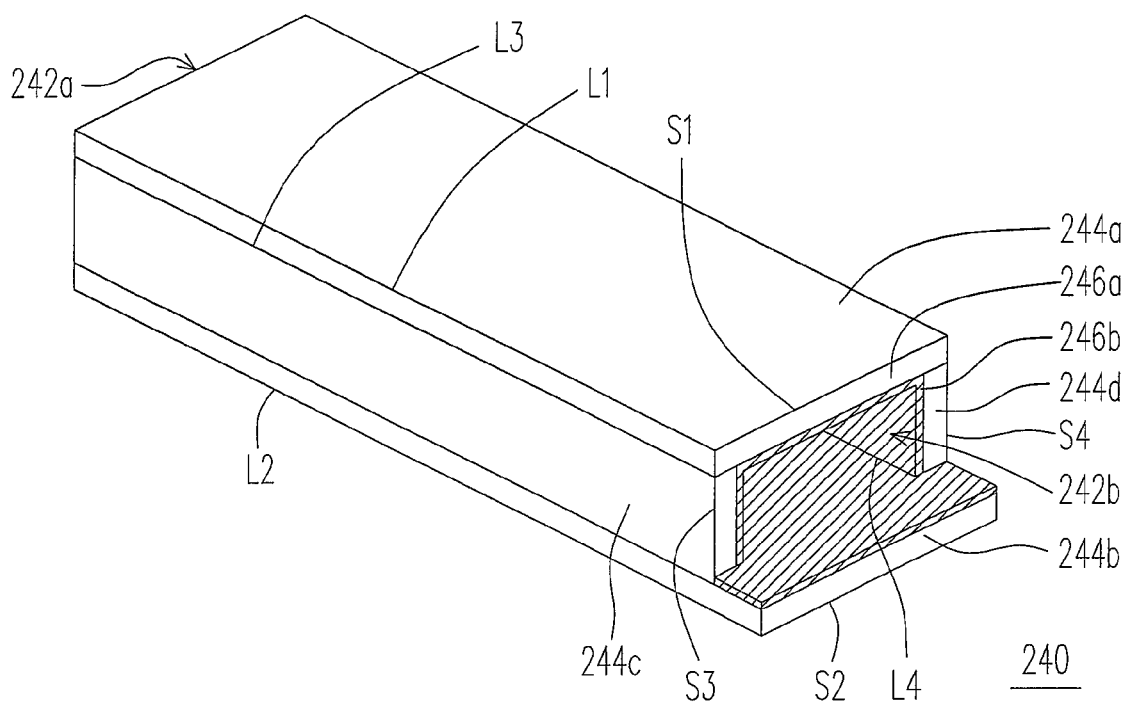
FIG. 3B is a 3D-diagram of the light integration rod in FIG. 3A.

Referring to FIGS. 3A and 3B, a projection apparatus 200 according to an embodiment of the present invention includes a light source module 210, a projection lens 220, a light valve 230 and a light integration rod 240. The light source module 210 is for providing an illumination beam 212. The light valve 230 is for converting the illumination beam 212 into an image beam 232 and making the image beam 232 travel to the projection lens 220, and the illumination beam 212 is obliquely incident upon the light valve 230. The light integration rod 240 is disposed on the transmission path of the illumination beam 212 and has a light input end 242a and a light output end 242b opposite to each other. The light input end 242a is located between the light source module 210 and the light output end 242b, while the light output end 242b is located between the light input end 242a and the light valve 230. The light integration rod 240 includes a first reflective plate 244a, a second reflective plate 244b, a third reflective plate 244c and a fourth reflective plate 244d. The first reflective plate 244a has a short side S1 located at the light output end 242b and a long side L1. The second reflective plate 244b is opposite to the first reflective plate 244a and has a short side S2 located at the light output end 242b and a long side L2. The third reflective plate 244c connects the first reflective plate 244a and the second reflective plate 244b, and has a short side S3 located at the light output end 242b and a long side L3. The fourth reflective plate 244d connects the first reflective plate 244a and the second reflective plate 244b, and is opposite to the third reflective plate 244c. The fourth reflective plate 244d has a short side S4 located at the light output end 242b and a long side L4. The length of the long side L1 of the first reflective plate 244a is unequal to the length of the long side L2 of the second reflective plate 244b. The short side of at least one of the first reflective plate 244a and the second reflective plate 244b is separate from the short side S3 of the third reflective plate 244c and the short side S4 of the fourth reflective plate 244d.

In the present embodiment, each of the first reflective plate 244a, the second reflective plate 244b, the third reflective plate 244c and the fourth reflective plate 244d may include a substrate 246a and a reflective film 246b disposed on the substrate 246a. In more detail, the reflective film 246b of the first reflective plate 244a and the reflective film 246b of the second reflective plate 244b may be opposite to each other, while the reflective film 246b of the third reflective plate 244c and the reflective film 246b of the fourth reflective plate 244d may be opposite to each other. The material of the substrate 246a is, for example, metal, glass or other appropriate materials, while the reflective film 246b is, for example, a metal film or other films suitable for reflecting.

After the illumination beam 212 from the light source module 210 enters the light integration rod 240 through the light input end 242a, the illumination beam 212 may be multi-reflected between the first reflective plate 244a, the second reflective plate 244b, the third reflective plate 244c and the fourth reflective plate 244d and then output through the light output end 242b. After that, by using at least a lens 250, the illumination beam 212 output from the light output end 242b is imaged on the light valve 230. The light valve 230 is, for example, a DMD or a liquid crystal on silicon panel (LCOS panel).

In the present embodiment, the light integration rod 240 adopts an asymmetrical structure, the edges of the first reflective plate 244a, the third reflective plate 244c and the fourth reflective plate 244d at the light output end 242b are coplanar, and the second reflective plate 244b protrudes at the light output end 242b and beyond the third reflective plate 244c and the fourth reflective plate 244d. Thus, in the projection apparatus 200 of the present embodiment, the optical path length from the edge of the second reflective plate 244b at the light output end 242b to a corresponding end 234a of the light valve 230 may more approximate the optical path length from the edge of the first reflective plate 244a at the light output end 242b to another corresponding end 234b of the light valve 230, which is helpful to lighten the defocusing of the illumination beam 212 at both ends 234a and 234b of the light valve 230. In this way, the blur extent of the edges of the light spot formed by the illumination beam 212 projected onto the light valve 230 is effectively reduced, so that a higher proportion of the illumination beam 212 is utilized by the projection apparatus 200 of the present embodiment. In addition, during fabricating the light integration rod 240, since the substrates 246a are not required to be cut into trapezoid, the rest scrap of the substrates 246a after cutting is decreased very much, which lowers the cost of the light integration rod 240. Moreover, the cutting accuracy of the substrates 246a are not required as high as that the plates of a wedge light integration rod requires, which further lowers the production cost of the light integration rod 240.

In the projection apparatus 200 according to the present embodiment, two edges of the light spot formed by the illumination beam 212 projected on the light valve 230 blurs more slightly, compared with the prior art, and one of the two edges is near to the end of the light valve 230, while the other is near to the end 234b of the light valve 230. In other words, in comparison with the symmetrical light integration rod with four equal-length side plates, the area of the light spot without blurring shares a larger proportion in the total area of the light spot. Furthermore, by properly adjusting the size of the light spot, the portion of the area of the light spot without blurring exceeding the area of the light spot without blurring corresponding to the symmetrical light integration rod with four equal-length side plates is projected onto the display region of the light valve 230. In this way, the utilization efficiency of the illumination beam 212 in the projection apparatus 200 is improved, and accordingly the brightness of display pictures provided by the projection apparatus 200 is improved.

Figure 4:
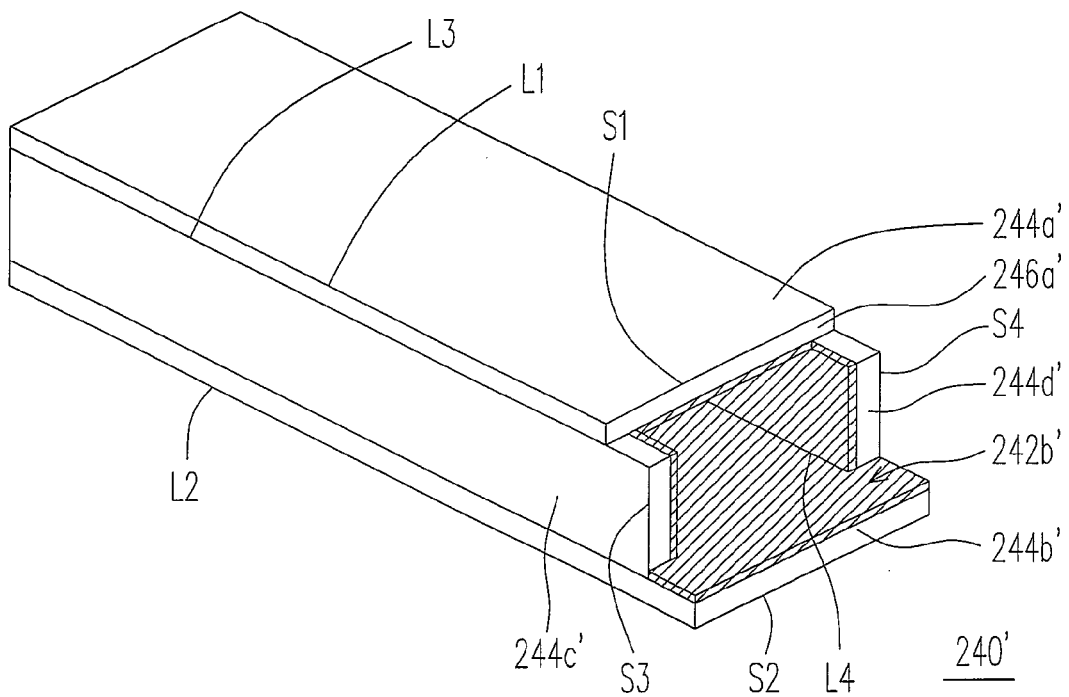
FIG. 4 is a structure diagram of a light integration rod according to another embodiment of the present invention.

Referring to FIG. 4, a light integration rod 240' according to another embodiment of the present invention is similar to the above-mentioned light integration rod 240 (referring to FIG. 3B) except for the following differences. A third reflective plate 244c' and a fourth reflective plate 244d' of the light integration rod 240' protrude at a light output end 242b' and beyond a first reflective plate 244a' of the light integration rod 240'. In addition, a second reflective plate 244b' protrudes at the light output end 242b' and beyond the third reflective plate 244c' and the fourth reflective plate 244d'.

Referring to FIGS. 3A and 4, in the light integration rod 240' according to the present embodiment, the second reflective plate 244b' still protrudes beyond the first reflective plate 244a'. When the light integration rod 240', instead of the light integration rod 240, is used in the above-mentioned projection apparatus 200, two edges of the light spot formed on the light valve 230 blur more slightly after the illumination beam 212 passes through the light integration rod 240'.

Figure 5:
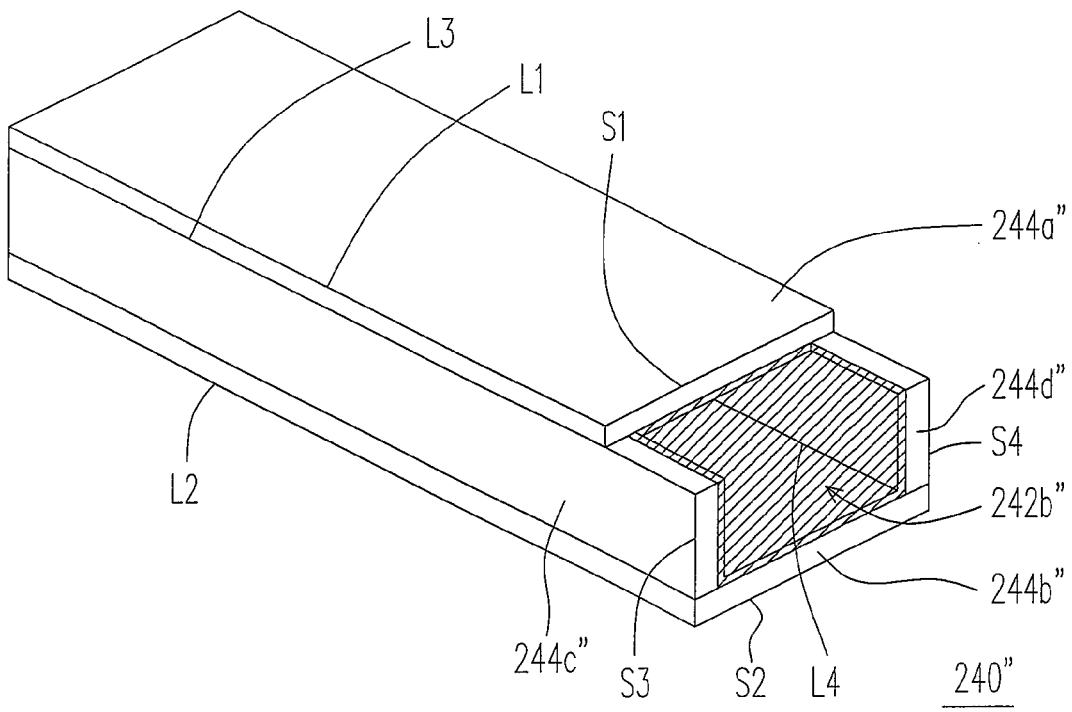
FIG. 5 is a 3D-diagram of a light integration rod according to yet another embodiment of the present invention.

Referring to FIG. 5, a light integration rod 240" according to yet another embodiment of the present invention is similar to the above-mentioned light integration rod 240 (referring to FIG. 3B) except for the following differences. In the light integration rod 240", a third reflective plate 244c" and a fourth reflective plate 244d" protrude at a light output end 242b" and beyond a first reflective plate 244a", while the edges of a second reflective plate 244b", the third reflective plate 244c" and the fourth reflective plate 244d" at the light output end 242b" are coplanar. The light integration rod 240" according to the present embodiment has the similar advantages as those of the above-mentioned light integration rod 240, and the details will not be repeated herein again. The light integration rod 240' may replace the light integration rod 240 (referring to FIG. 3A) to be used in the projection apparatus 200. Two edges of the light spot formed on the light valve corresponding to the light integration rod 240" also blur more slightly.

Figure 6:
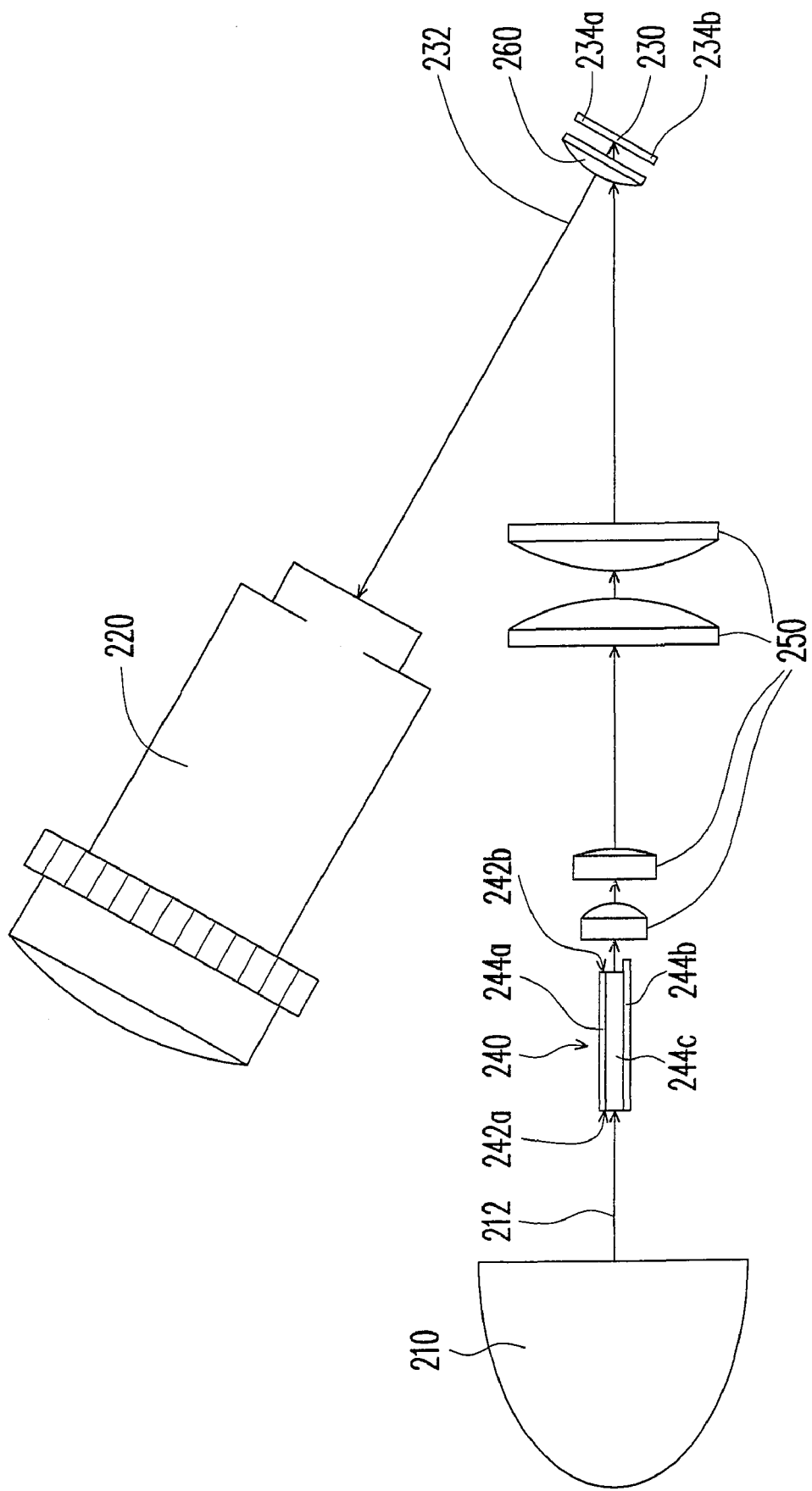
FIGS. 6-8 are diagrams of projection apparatuses according to other three embodiments of the present invention.
Figure 7:
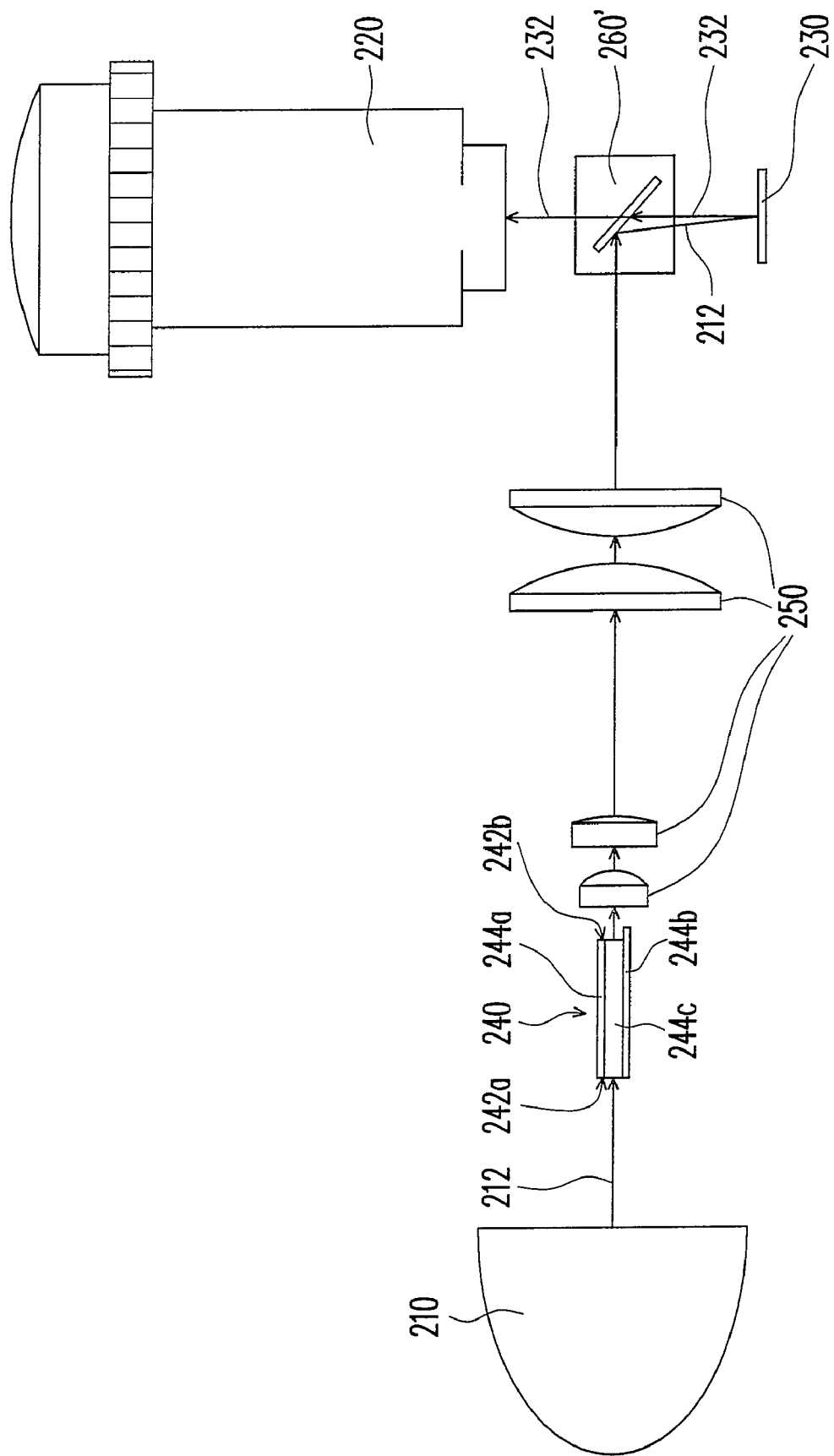
Figure 8:
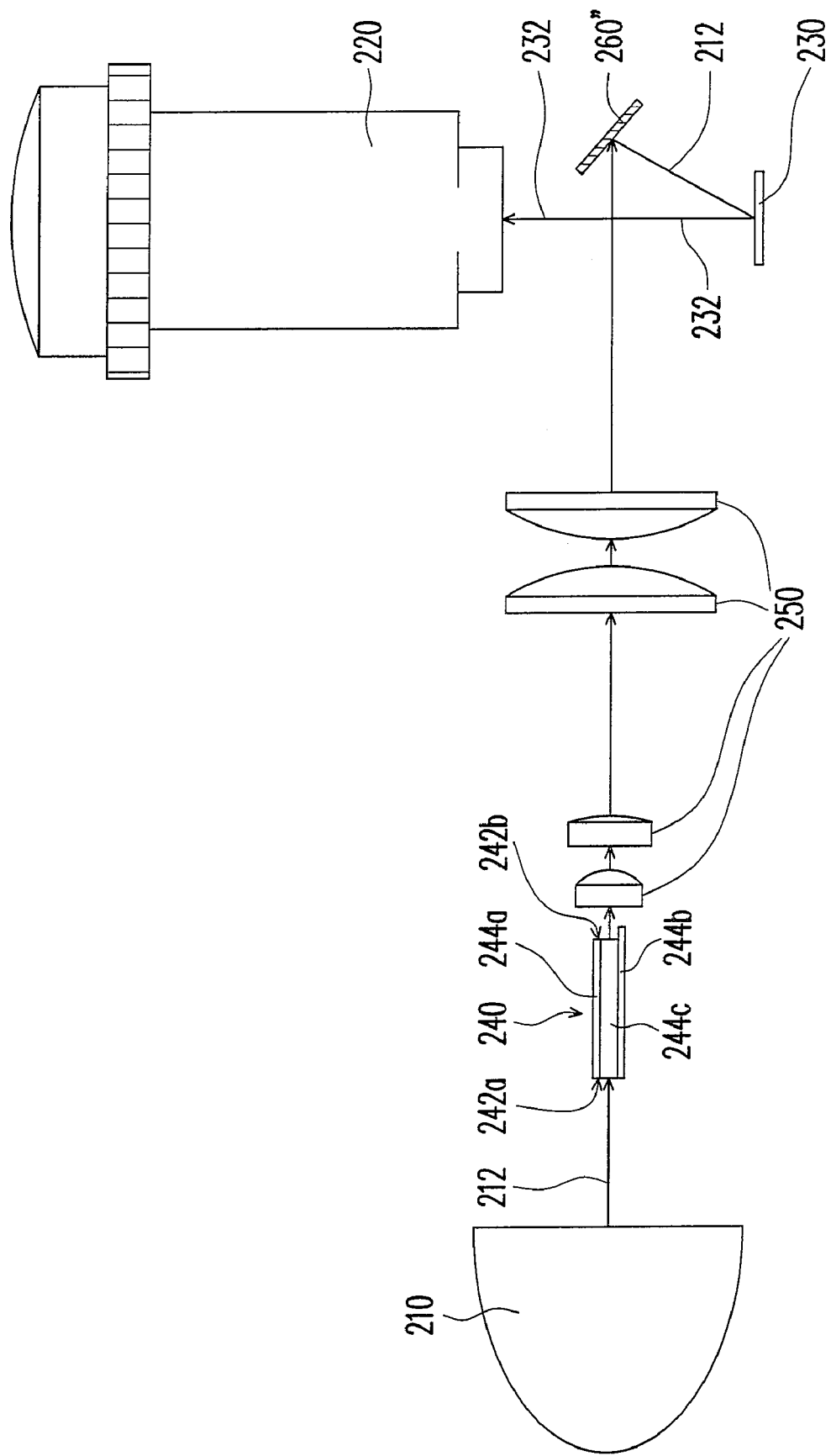

FIGS. 6-8 are diagrams of projection apparatuses according to other three embodiments of the present invention. Referring to FIGS. 6-8, the light integration rod 240 (referring to FIG. 3B), the light integration rod 240' (referring to FIG. 4) and the light integration rod 240" (referring to FIG. 5) in the present invention are applicable to projection apparatuses with various architectures. For example, in a projection apparatus according to other embodiments of the present invention, a field lens 260 (as shown in FIG. 6) may be disposed on the transmission path of the illumination beam 212 between the light integration rod 240 and the light valve 230 and on the transmission path of the image beam 232 between the projection lens 220 and the light valve 230. Alternatively, in the present invention, a total internal reflection prism 260' (as shown in FIG. 7) may be disposed at the above-mentioned location of the field lens 260, or a reflective mirror 260" (as shown by FIG. 8) may be disposed on the transmission path of the illumination beam 212 between the light integration rod 240 and the light valve 230.

In summary, in the projection apparatus, the illumination beam is obliquely incident upon the light valve. In addition, the light integration rod of the present invention adopts an asymmetrical structure, and the length of a long side of the first reflective plate is unequal to the length of a long side of the second reflective plate, so as to make the second reflective plate protrude at the light output end and beyond the first reflective plate. Thus, the optical path length from the edge of the second reflective plate at the light output end to an corresponding end of the light valve more approximates the optical path length from the edge of the first reflective plate at the light output end to another corresponding end of the light valve, which lightens the defocusing of the illumination beam at both ends of the light valve. In this way, the blur extent of the edges of the light spot formed by the illumination beam projected onto the light valve is effectively reduced, so that a higher proportion of the illumination beam is utilized by the projection apparatus, and the projection apparatus provides display pictures with higher brightness.

Besides, in the light integration rod, the short side of at least one of the first reflective plate and the second reflective plate is separate from the short side of the third reflective plate and the short side of the fourth reflective plate. That is, the edges of the third reflective plate and the fourth reflective plate at the light output end may be coplanar with the edge of the first reflective plate or the second reflective plate at the light output end, or the edges of the first, second, third and fourth reflective plates at the light output end may be substantially parallel to one another. As a result, during fabricating the light integration rod, since the substrates are not required to be cut into trapezoid as the prior art, the rest scrap of the substrates after cutting is decreased very much, which lowers the cost of the light integration rod. Therefore, the projection apparatus employing the light integration rod of the present invention has a lower cost. It should be noted that the above-mentioned protruding design with respect to the first reflective plate and the second reflective plate may also be applied to the third reflective plate and the fourth reflective plate, and the present invention is not limited thereto.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a light source module, for providing an illumination beam;
   a projection lens;
   a light valve, for converting the illumination beam into an image beam and making the image beam travel to the projection lens, wherein the illumination beam is obliquely incident upon the light valve;
   a light integration rod, disposed on a transmission path of the illumination beam, the light integration rod having a light input end and a light output end opposite to each other, wherein the light input end is located between the light source module and the light output end, the light output end is located between the light input end and the light valve, and the light integration rod comprises:
   a first reflective plate, having a short side located at the light output end and a long side;
   a second reflective plate, opposite to the first reflective plate and having a short side located at the light output end and a long side;
   a third reflective plate, connecting the first reflective plate and the second reflective plate and having a short side located at the light output end and a long side; and
   a fourth reflective plate, connecting the first reflective plate and the second reflective plate, the fourth reflective plate being opposite to the third reflective plate and having a short side located at the light output end and a long side, wherein a length of the long side of the first reflective plate is unequal to a length of the long side of the second reflective plate, the short side of at least one of the first reflective plate and the second reflective plate is separate from the short side of the third reflective plate and the short side of the fourth reflective plate.

2. The projection apparatus according to claim 1, wherein edges of the first reflective plate, the third reflective plate and the fourth reflective plate at the light output end are coplanar, while the second reflective plate protrudes at the light output end and beyond the third reflective plate and the fourth reflective plate.

3. The projection apparatus according to claim 1, wherein edges of the second reflective plate, the third reflective plate and the fourth reflective plate at the light output end are coplanar, while the third reflective plate and the fourth reflective plate protrude at the light output end and beyond the first reflective plate.

4. The projection apparatus according to claim 1, wherein the third reflective plate and the fourth reflective plate protrude at the light output end and beyond the first reflective plate, while the second reflective plate protrudes at the light output end and beyond the third reflective plate and the fourth reflective plate.

5. The projection apparatus according to claim 1, wherein each of the first reflective plate, the second reflective plate, the third reflective plate and the fourth reflective plate comprises a substrate and a reflective film disposed on the substrate.

6. The projection apparatus according to claim 5, wherein material of the substrate comprises metal or glass.

7. The projection apparatus according to claim 5, wherein the reflective film comprises a metal film.

8. The projection apparatus according to claim 1, wherein the light valve is a digital micro-mirror device or a liquid crystal on silicon panel.

9. The projection apparatus according to claim 1, further comprising an total internal reflection prism, disposed on a transmission path of the illumination beam between the light integration rod and the light valve and on a transmission path of the image beam between the projection lens and the light valve.

10. The projection apparatus according to claim 1, further comprising a field mirror, disposed on a transmission path of the illumination beam between the light integration rod and the light valve and on a transmission path of the image beam between the projection lens and the light valve.

11. The projection apparatus according to claim 1, further comprising a reflective mirror, disposed on a transmission path of the illumination beam between the light integration rod and the light valve.

12. A light integration rod, adapted to be used in a projection apparatus and having a light input end and a light output end opposite to each other, the light integration rod comprising:

a first reflective plate, having a short side located at the light output end and a long side;

a second reflective plate, opposite to the first reflective plate and having a short side located at the light output end and a long side;

a third reflective plate, connecting the first reflective plate and the second reflective plate and having a short side located at the light output end and a long side; and a fourth reflective plate, connecting the first reflective plate and the second reflective plate, the fourth reflective plate being opposite to the third reflective plate and having a short side located at the light output end and a long side, wherein a length of the long side of the first reflective plate is unequal to a length of the long side of the second reflective plate, the short side of at least one of the first reflective plate and the second reflective plate is separate from the short side of the third reflective plate and the short side of the fourth reflective plate.

13. The light integration rod according to claim 12, wherein edges of the first reflective plate, the third reflective plate and the fourth reflective plate at the light output end are coplanar, while the second reflective plate protrudes at the light output end and beyond the third reflective plate and the fourth reflective plate.

14. The light integration rod according to claim 12, wherein edges of the second reflective plate, the third reflective plate and the fourth reflective plate at the light output end are coplanar, while the third reflective plate and the fourth reflective plate protrude at the light output end and beyond the first reflective plate.

15. The light integration rod according to claim 12, wherein the third reflective plate and the fourth reflective plate protrude at the light output end and beyond the first reflective plate, while the second reflective plate protrudes at the light output end and beyond the third reflective plate and the fourth reflective plate.

16. The light integration rod according to claim 12, wherein each of the first reflective plate, the second reflective plate, the third reflective plate and the fourth reflective plate comprises a substrate and a reflective film disposed on the substrate.

17. The light integration rod according to claim 16, wherein material of the substrate comprises metal or glass.

18. The light integration rod according to claim 16, wherein the reflective film comprises a metal film.

* * * * *